United States Patent [19]

Hrabak et al.

[11] 4,042,644

[45] Aug. 16, 1977

[54] PROCESS FOR PRODUCING OF POLYMERS BY CONNECTING OF POLYMERIC MOLECULES

[75] Inventors: Frantisek Hrabak; Vlasta Hynkova, both of Prague; Jan Lokaj, Letonice by Vyskov, all of Czechoslovakia

[73] Assignee: Czechoslovenska akademie ved, Prague, Czechoslovakia

[21] Appl. No.: 281,286

[22] Filed: Aug. 17, 1972

Related U.S. Application Data

[63] Continuation-in-part of Ser. No. 186,799, Oct. 5, 1971, abandoned.

[51] Int. Cl.$^2$ .................... C08F 8/06; C08G 73/00; C08G 85/00
[52] U.S. Cl. .................... 260/849; 526/23; 526/56; 526/57; 526/58; 526/310
[58] Field of Search ......... 260/78.4 D, 82.1, 88.1 PN, 260/89.7 S, 849

[56] References Cited

U.S. PATENT DOCUMENTS

| | | | |
|---|---|---|---|
| 3,078,254 | 2/1963 | Zelinski et al. | 260/45.5 |
| 3,135,716 | 6/1964 | Uraneck et al. | 260/45.5 |
| 3,177,190 | 4/1965 | Hsieh | 260/94.2 |
| 3,178,398 | 4/1965 | Strobel et al. | 260/85.1 |
| 3,251,812 | 5/1966 | Hsieh | 260/79.5 |
| 3,651,025 | 3/1972 | Bean et al. | 260/78.4 D |

OTHER PUBLICATIONS

Nature, vol. 176, Bamford et al., p. 78, 7/9/55.

*Primary Examiner*—John Kight, III

[57] ABSTRACT

Process for producing polymers comprising connecting polymeric molecules which contain chemically bound tertiary amino groups in the chain by oxidizing the macromolecules to be connected with air or an oxidizing agent such as compounds containing a peroxidic bond, for example, inorganic and organic peroxides, or organic anhydrides. It is possible to connect chains of identical or different types and in this way increase the molecular weight, produce block copolymers, cure films of varnishes and perform vulcanization and the like at ambient temperature.

4 Claims, No Drawings

PROCESS FOR PRODUCING OF POLYMERS BY CONNECTING OF POLYMERIC MOLECULES

BACKGROUND OF THE INVENTION

This application is a continuation in part of copending application U.S. Ser. No. 186,799 filed Oct. 5, 1971, now abandoned and entitled "Process For Producing of Polymers by Connecting of Polymeric Molecules."

This invention relates to a process for preparing polymers. More particularly, the invention relates to a process for producing polymers by connecting polymeric molecules by chemical bonds in which the polymers to be connected contains chemically bound tertiary amino groups.

In general, present methods or processes used for connecting macromolecules make use of functional groups attached to the polymeric chains which readily condense with cross-linking agents (such as, for example, hydroxy groups reacting with isocyanates or dianhydrides). A disadvantge of the known methods resides in the fact that functional groups, such as the aforesaid groups, react relatively readily with the components of the polymerization charges in the production of the polymers or with the components of polymeric mixtures as their processing takes place. In addition, the utilization of high temperatures are generally necessary in many cases in carrying out these processes. There exists, therefore, a need for a process of connecting polymeric molecules which does not exhibit the mentioned disadvantages. The present invention provides such a process.

SUMMARY OF THE INVENTION

In accordance with the invention, there is provided a process for connecting at least two polymeric molecules which contain chemically bound tertiary amino groups comprising the steps of mixing the polymeric molecules to be connected, oxidizing the mixture at ambient temperature for a time sufficient to allow the reaction between the polymeric molecules to run to substantial completion and recovering a connected polymeric product.

DESCRIPTION OF THE PREFERRED EMBODIMENTS

Generally, the present invention is based on the fact that polymers and copolymers containing at least one chemically based tertiary amino group in the molecule can readily be connected by the process of this invention. Consequently, a wide variety of polymeric molecules can be employed in the practice of this invention. The molecules can be, for example, either linear polymeric chains of the same type, such as polystyrene with polystyrene or chains of a different type, such as polystyrene with polybutadiene, so long as at least one chemically bound tertiary amino group is present in one polymer chain. It is to be understood, however, that any polymer with one or more chemically bound tertiary amino groups can be employed in the practice of this invention. Furthermore, polymers or copolymers which contain a larger number of chemically bound tertiary amino groups and which are soluble and/or meltable are generally connected into insoluble cross-linked polymers in accordance with this invention. In contrast, polymers and copolymers containing a low number of chemically bound tertiary amino groups when connected, maintain their solubility. Generally, therefore, the density of the cross-links formed between polymeric chains can be controlled by the number of tertiary amino groups built into the chain, as well as by the amount of oxygen or oxidizing agent employed. Consequently, as the number of tertiary amino groups in a polymeric molecule is increased, the density of the cross-links is increased and insoluble connected macromolecules obtained where identical chain are connected. Where, however, the number of tertiary amino groups is decreased in connecting idential chains, non-cross-linked macromolecules are obtained which are generally soluble. In those cases where the number of tertiary amino groups is increased and when connecting different types of chains, cross-linked block copolymers are formed. Likewise, where the number of amino groups is decreased, soluble block copolymers are formed.

The tertiary amino groups can be built into a polymer and/or polymers to be connected by any suitable method, such as during production of the original polymer chain by the addition of suitable co-monomer containing the amino groups or by any other suitable method. In addition to air, a wide variety of other oxidizing agents can be employed in carrying out the process of this invention. For example, any compounds containing a peroxide bond (—O—O—) can be employed. Such reagents include but are not limited to inorganic and organic peroxide compounds. Other suitable oxidizing agents are anhydrides of organic acids. Some examples of useful agents are benzoyl peroxide, tertiary butyl peroxide, hydrogen peroxide, potassium persulphate, phthalic anhydride, acetic anhydride and the like. Moreover the oxidizer is generally employed in at least an amount that is equimolar to the amino group content of the polymer to be connected.

Generally, the process of this invention is carried out simply by mixing the polymeric materials to be connected and introducing air, compound containing the peroxidic groups or anhydride of an organic acid in any suitably convenient manner, such as mostly by exposing the mixture to air, introducing the oxidizing agent in solution or any other suitable manner and connecting the polymer at ambient temperature, allowing the reaction to run to substantial completion and recovering a connected polymeric product. It is to be noted, however, that the reaction can be sped up by the application of heat in any suitable manner. Care should be taken, however, not to raise the temperature above the limit at which the heat of reaction cannot be led away or dissipated relatively rapidly in order to prevent loss of desirable properties of the material being formed or degradation of the material being formed.

Furthermore, the connection of the polymeric molecules can take place in solution, aqueous emulsions or dispersions, as well as solid mixtures of the polymers or melts thereof. In general, where processes in solutions are employed to carry out the process of this invention, any known liquid solvents which are solvents for the particular polymers and/or amino polymers being used can be employed except those which react with tertiary amines, such as for example, organic acids which form salts with the amines or alkylhalides which form quaternary salts with the amines. Examples of suitable readily available and inexpensive solvents which may be used in this invention are benzene and water. In addition, the process of connecting the polymeric macromolecules can be accomplished in latexes formed with any known emulsifier providing the pH value of any latex used is adjusted to a value in a range of from about 6 to about 12 before addition of the oxidizing agents or anhydrides of organic acids. Examples of suitable emulsifiers are potassium laurate and mersolate.

The criteria for effecting the process in solution, emulsion or melt is dependent upon a number of factors, such as the character of the product being formed and the properties of the aminopolymer to be connected, such as it's solubility, temperature of transition into a plastic state and the degradation temperature. For example, solution and emulsion processes in which the oxidizing material is added to a solution or emulsion comprising the aminopolymer are used, if hardening or curing of coatings, such as in paints or sheets or films of the aminopolymer is desired. Such is also true in those cases where it is desired to produce turbidity in solutions or emulsions of aminopolymer (aqueous or nonaqueous) and in those cases where it is desirable to form in solutions or emulsions higher molecular weight materials or to join polymeric chains of different character or to produce a solution or emulsion of block copolymer. On the other hand, a melt process is generally useful to increase or raise the molecular weight of solid polymers or to produce solid block copolymers from two or more different amine polymers in suitable known types of mixing apparatus, rolling mills or pressure molding apparatus.

The process of this invention is useful in a wide variety of areas. Some examples of technical application of the invention are:

1. Increasing the molecular weight of homopolymers by connecting identical chains with a small number of amino groups. Higher molecular weight polymers may be achieved conventionally by suppressing the polymerization rate, as is well known in the field of polymers. The process of this invention permits the higher rates of polymerization and connecting the polymeric chains after polymerization has been completed.

2. In the production of block copolymers, the process of this invention results in the formation of block copolymers with properties different from those of the original homopolymers by connecting of qualitatively different polymeric chains which contain a small number of amino groups.

3. In the production of varnishes, modified solutions, aqueous emulsions or dispersions of polymers which contain tertiary amine groups may be used as film-forming compositions which are cured or solidify in air at usual or ambient atmospheric temperatures.

4. In the vulcanizing of polymers, homopolymers which contain a higher concentration of tertiary amino groups or mixtures of such homopolymers may be cross-linked by the process of the invention at usual or ambient temperatures.

THE EXAMPLES

The following examples will further illustrate the invention without limiting its scope. In the examples all parts and percentages are by weight unless otherwise stated.

EXAMPLE I 2 grams of white powdery poly (N,N-dimethyl-p-aminostyrene), soluble in benzene and also in dilute hydrochloric acid, was exposed to the air of the atmosphere for a period of four months. During this time it turned yellowish and became insoluble in benezene exhibiting only swelling.

EXAMPLE II

Benzoyl peroxide was added as 1 ml of a 5% solution in benzene to a solution of 0.5 grams of poly (N, N-dimethyl-p-aminostyrene) in 10 ml of benzene at room temperature. After 5 hours the precipitate formed was separated by filtration. The filtrate was diluted with a sevenfold volume of methanol with no evidence of precipitate. This fact is indicative of the complete conversion of poly (N, N-dimethyl-p-aminostyrene) into gel.

EXAMPLE III

A solution of 0.25 grams of poly (N,N-dimethyl-p-aminostyrene) in 5 ml benzene was mixed with 0.5 ml of 10% solution of tertiary butyl peroxide. A brown gel (0.25 grams) precipitated from the solution after two days.

EXAMPLE IV

A 30% aqueous solution of hydrogen peroxide (0.5 ml) was added with stirring to 5 ml of 30% latex (potassium laurate as emulsifier) of poly (N, N-dimethyl-p-aminostyrene), which was previously freed from monomer by means of steam. After 8 hours standing at room temperature the polymer was precipitated by an addition of 50 ml of methanol to the latex. The polymer was dried in vacuo, shaken with 50 ml of benzene for 3 hours and the remaining insoluble gel was separated by centrifugation at 3000 r.p.m. The amount of the gel was 15% of the total polymer.

EXAMPLE V

Benzoyl peroxide, as 1 ml of 10% solution in benzene, was added with stirring at room temperature into 5 ml of 30% latex (potassium laurate emulsifier) of poly (N, N-dimethy-p-aminostyrene) which was previously freed from monomer. The polymer precipitated from the mixture after 2 hours. The whole polymer was then precipitated by an addition of 50 ml of methanol and the insoluble gel was separated as is described in example IV. The gel portion was 95% of the total polymer in the latex.

EXAMPLE VI

A solution of 0.15 grams of potassium persulphate in 1 ml of water was added under stirring to 5 ml of 30% monomer-free latex (potassium laurate emulsifier) of poly (N,N-dimethyl-p-aminostyrene). After 6 hours at room temperataure the insoluble portion of the polymer was determined as in Example IV and it was 97% of the total polymer in the latex.

EXAMPLE VII

A solution of 0.25 grams of a copolymer of N,N-dimethyl-p-aminostyrene and styrene (molecular ratio 1 : 33) in 5 ml of benzene was mixed with 0.5 ml of 5% solution of benzoyl peroxide in benzene. The polymeric gel (0.25 grams) separated from the solution at room temperature after 24 hours.

EXAMPLE VIII

A solution of 0.25 grams of a copolymer of N,N-dimethyl-p-aminostyrene and butadiene (molecular ratio 1 : 3) in 5 ml of benzene was mixed with 0.5 ml of 5% solution of benzoyl peroxide in benzene. The polymeric gel (0.25 grams) separated from the solution at room temperature after 24 hours.

EXAMPLE IX

A solution of 0.25 grams of the copolymer of N,N-dimethylaminoethyl acrylate and methyl methacrylate (molecular ratio 1 : 33) in 5 ml of benzene was mixed with 0.5 ml of a 10% solution of benzoyl peroxide in benzene. The solution was converted at room temperature into a gelatinous elastic block within 1 hour.

EXAMPLE X

A 10% solution of phthalic anhydride in benzene (0.5 ml) was added to a solution of 0.25 grams of poly (N, N-dimethyl-p-aminostyrene) in 5 ml of benzene. The brown polymeric gel (0.25 grams) separated at room temperature from the solution after 2 days.

EXAMPLE XI

A mixture of 0.5 grams of poly (N, N-dimethyl-p-aminostyrene) and 0.05 grams of phthalic anhydride was finely ground and then heated in a sealed evacuated ampoule to 250° C for 30 minutes. The resulting brownish plug did not dissolve, but only swelled, in benzene.

EXAMPLE XII

A plug prepared by pressing of a mixture of 1 gram of poly (N, N-dimethyl-p-aminostyrene) and 0.1 gram of phthalic anhydride at room temperature was kept at the room temperature for 72 hours. After this period of time it was yellow and did not dissolve, but only swelled, in benzene.

In the above examples, the coagulater designated as gels were cross-linked since they did not dissolve in benzene, a good solvent for all starting aminopolymers.

Numerous modifications of this invention may be made without departing from the spirit and scope thereof. It is to be understood, therefore, that the invention is not to be limited to the disclosed embodiments except as defined in the appended claims.

What is claimed is:

1. A process for connecting polymers wherein at least one of said polymers contains at least one tertiary amino group in the chain thereof comprising admixing said polymers in the presence of an oxidizing agent at ambient temperature for a period of time sufficient to cause substantial crosslinking of said polymers wherein said tertiary amino groups are present in a major proportion and the product formed is a crosslinked material.

2. A process as defined in claim 1 wherein the mixture of polymeric molecules is oxidized with ambient air.

3. A process as defined in claim 1 wherein the oxidizing agent is hydrogen peroxide.

4. A process as defined in claim 1 wherein said polymers are dissimilar.

* * * * *